Jan. 9, 1968   C. W. R. HICKIN   3,363,187
PULSE CENTER DETECTOR
Filed Nov. 19, 1964                                                2 Sheets-Sheet 1

Jan. 9, 1968
C. W. R. HICKIN
3,363,187
PULSE CENTER DETECTOR
Filed Nov. 19, 1964
2 Sheets-Sheet 2
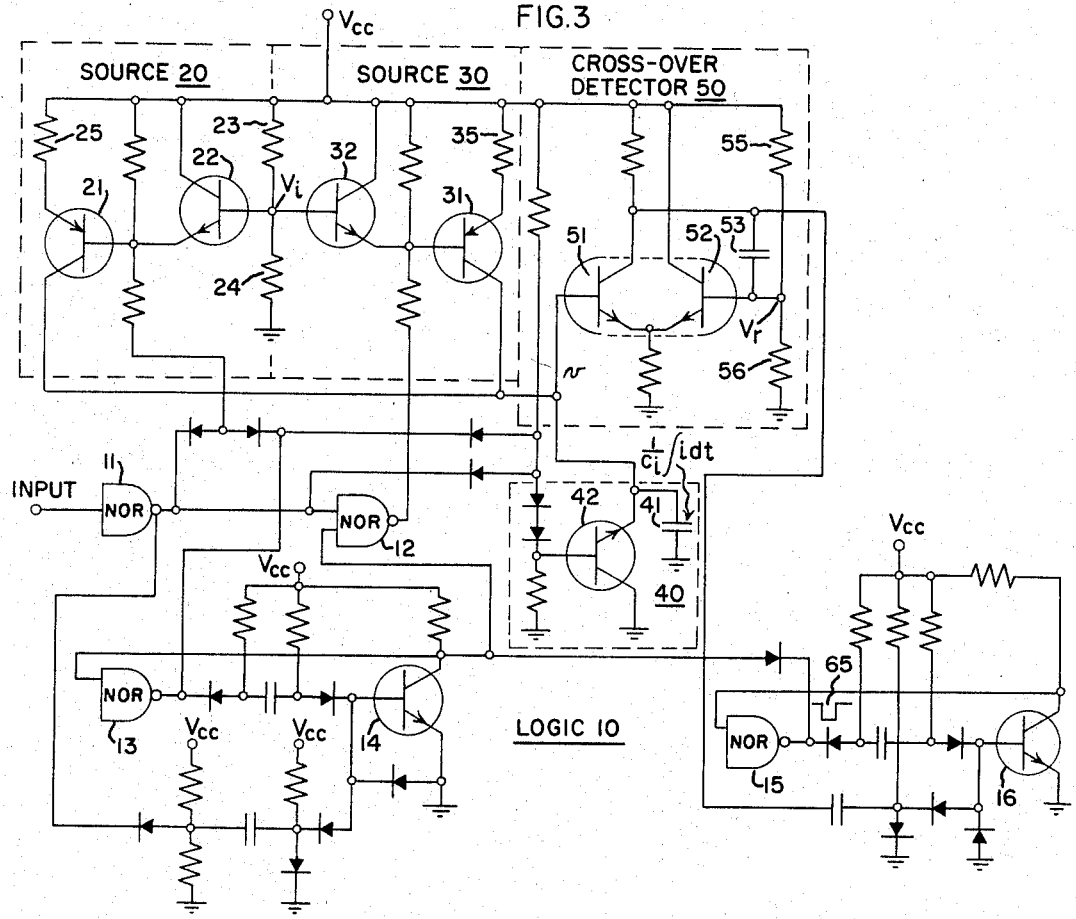
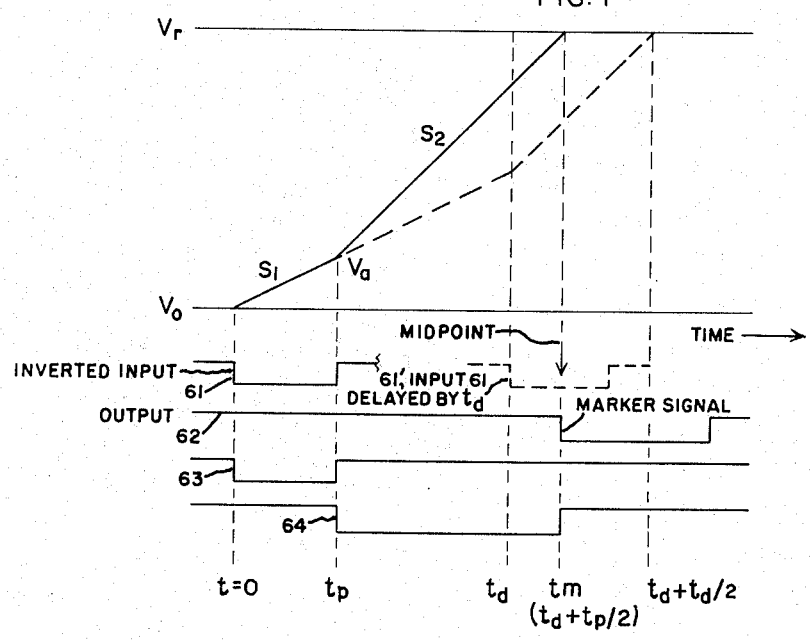

United States Patent Office 3,363,187
Patented Jan. 9, 1968

3,363,187
PULSE CENTER DETECTOR
Charles W. R. Hickin, Binghamton, N.Y., assignor to General Electric Company, a corporation of New York
Filed Nov. 19, 1964, Ser. No. 412,486
6 Claims. (Cl. 328—108)

ABSTRACT OF THE DISCLOSURE

Method and apparatus for determining the midpoint or other fractional point in time of a pulse by generation of a marker signal occurring at a predetermined time after the fractional point in time by integrating signals of predetermined relative intensity, and generating a marker signal responsive to the integrated signals reaching a predetermined level.

---

This invention is directed to a system for generating a real-time marker signal representing the midpoint, or any other desired fractional point, between the leading and trailing edges of a pulse and which follows the pulse by a known time delay. Since a pulse can represent time events generally, the invention is useful for dectecting an intermediate point at any time event. But the information usually desired is the pulse midpoint which is considered the pulse position time.

The invention arose as a solution to a problem in generating a pulse signal representing the occurrence of a time event, namely, the crossing of a scribed line on a rotating spherical surface past a photoelectric sensor. The pulse generated by the photoelectric sensor was a voltage signal such as illustrated in FIGURE 1. Since the center of the scribe line corresponds to the midpoint of the pulse, a marker pulse was generated by finding the midpoint between the occurrences of leading and trailing pulse edges. While reasonable results can be obtained by storing the pulse and operating upon the integrated signal, the resulting circuit complexity, and more important, the requirement of an analog signal storage mechanism is undesirable.

Delay lines and equivalent storage devices, being of a different class of components from common electronic circuit components such as conventional resistors, transistors, integrated circuits, etc., require special manufacturing techniques. Also, pulse center detectors utilizing signal storage devices and input signal integrators are limited to a particular type of input pulse, within a particular range of pulse repetition rates, and have various limitations as to peak voltage levels, pulse duration times, impedance matching requirements, etc. In effect, pulse center detectors require a custom design for each application.

In the application mentioned above, measuring a spatial quantity, a pulse signal is generated which has time as a variable representing a physical quantity. In information processing where time is an information variable, the operating time of the data processing apparatus itself is an integral part of the data processing which is therefore operating in "real-time." The relationship of the apparatus time to the variable quantity being represented can be more or less artificial. For example, if a time event such as the time for a vehicle pitch oscillation cycle is being represented, a pulse occurring at the end of the cycle represents the variable quantity without any artificiality. One the other hand, the real-time occurrence of a pulse during data processing cycle may have an arbitrarily selected proportional relationship to some quantity such as oscillating frequency. In between is a range of relationships such as the time occurrence of a radar echo pulse which can be related to a distance to a target by a predetermined relationship. In general, these types of data processing have the common characteristic that the apparatus employed is adapted to respond to a pulse signal automatically and the response itself utilizes time as an integral part of the processing. While data may be stored, storage is normally minimized. If a control function is desired, the apparatus is designed to generate the required control signals, usually with no storage. Insofar as the apparatus can directly respond to input signals, apparatus for storing information is obviated together with apparatus for integrating stored data signals with signals occurring in real-time. However, for obtaining information on the midpoint of a time event, it is necessary to wait until the termination of the time event. Because of this fact, it would appear that a pulse signal representing a time event must be stored in order for a midpoint marker signal to be generated.

A striking example of where a midpoint marker signal is desirable is with radar return signals. The received signal in a sensitive radar system can vary greatly in amplitude and duration, depending upon the nature and distance of the target. Also, there can be varying background noise levels. Accordingly, it is sometimes difficult to differentiate between the time event pulse and the noise. Normally, the edges of a pulse are sensed by detecting when the sensed quantity such as a voltage crosses a selected threshold level. If variable noise levels are encountered, it is desirable to change the threshold level without changing all the pulse processing apparatus for midpoint marker signal generation.

Accordingly, it is an object of the invention to provide a simple pulse center detector which does not require input signal storage apparatus for generating an accurate midpoint marker signal.

It is a further object of the invention to provide an electronic pulse center detector which does not require accommodation of special pulse characteristics such as pulse magnitude, pulse duration, and pulse waveform, beyond the input circuit.

It is a further object of the invention to provide a process for generating a marker signal in real-time which occurs at a selected fraction of a time event having a variable duration, delayed by a selected time interval.

It is a further object of the invention to provide an electronic network, employing simple circuits, which in response to real-time, variable width, pulses generates a marker pulse having a rising or falling edge representing the input pulse midpoint in such a manner that the marker pulse is automatically generated in real-time for presentation or further data processing without additional circuitry for read-out or control.

Briefly stated, in accordance with certain aspects of the invention, a detector is provided comprised of a pair of constant current sources, a current integrator, a logic mechanism for successively switching the current sources to the integrator at the leading and trailing pulse edges, and a cross-over detector generating a sharp marker signal representing the time at which the integrated current reaches a predetermined level. By the proper selection of the relative current levels and the reference voltage level for the cross-over detector, it has been discovered that the output marker signal is automatically generated at a time, following the input pulse leading edge, equal to the pulse midpoint plus a known, constant, time delay, regardless of the pulse width. This is performed in an open loop manner without requiring input signal storage.

The invention, together with further objects and advantages thereof, may best be understood by referring to the following description taken in conjunction with the appended drawings in which like numerals indicate like parts and in which:

FIGURE 2 is a block diagram illustrating the operation of the novel pulse center detector.

FIGURE 3 is a schematic diagram of a preferred electronic embodiment of the invention.

FIGURE 4 is a diagram illustrating the operation of the FIGURE 3 embodiment.

FIGURE 5 is a block diagram of a second embodiment of the invention utilizing digital techniques.

Figure 1:
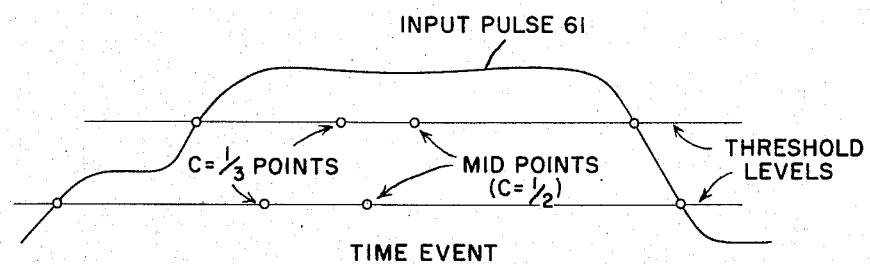
FIGURE 1 is a diagram illustrating a representative pulse for which it is desired to generate a marker signal representing its midpoint.
Figure 1:
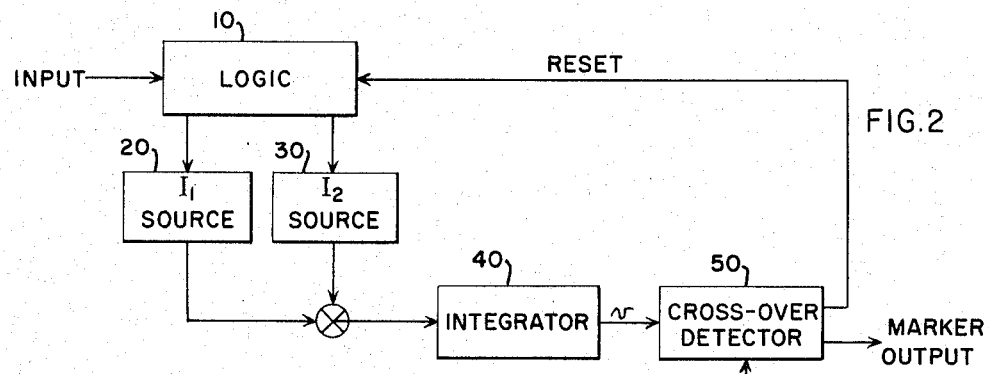
Figure 1:
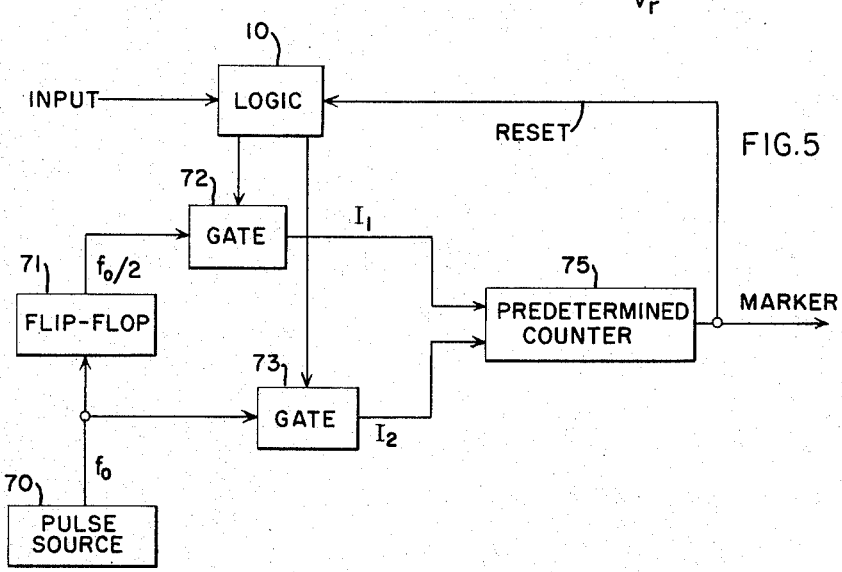

Referring now to the drawings, the output of the detector is a pulse 62, as illustrated in FIGURE 4, having a sharp leading edge which occurs at a time $t_m$, following the leading edge of a positive going input pulse 61, that is the sum of a predetermined time delay factor $t_d$ and $t_p/2$, the midpoint pulse width time of the input pulse. In the FIGURE 2 block diagram, the output pulse 62 is initiated by cross-over detector 50 having detected that the signal generated by current integrator 40 crossed a predetermined reference level $V_r$. The reference is a predetermined value selected such that the signals from constant signal sources 20 and 30 require the time $t_m = t_d + t_p/2$ to produce the integration level equal to $V_r$ in integrator 40. Logic 10 operates so that initially, in response to the leading edge of the input pulse 61, signal $I_1$ is switched to integrator 40 and at the termination of the input pulse 61, signal $I_2$ (twice signal $I_1$) is then switched to integrator 40 while $I_1$ is switched off from integrator 40. Logic 10 also provides the function of resetting the pulse center detector in response to cross-over detector 50 generating the output pulse 62.

Consider the ramps shown in FIGURE 4. The ramp with slope $S_1$ is generated during the event, or pulse 61. At the end of the event, the ramp with slope $S_2$ is generated and added to the end-point of the first ramp. This second ramp $S_2$ is allowed to continue until a predetermined level, $V_r$, is crossed-over. At this cross-over point a marker signal 62 is generated and the system is reset. It should be noted that in the waveforms of FIGURE 4, there are two reference voltage levels. For standard transistor circuitry such as the circuitry of FIGURE 3, the presence of a pulse is represented by an essentially ground level signal and the absence of a pulse is represented by a positive voltage level whereby most switching operations are performed by sensing the negative going leading edge of a pulse for which it is generally easier to obtain good switching characteristics.

If the input pulse having a pulse time $t_p$ were delayed by a constant delay time $t_d$, and with the following criteria observed, the marker signal appears at the midpoint of the hypothetical delayed input pulse 61′.

The desired marker time $t_m$ of the marker signal appearance is $$t_m = t_d + t_p/2 \quad (1)$$

The slope $S_1$ is determined by the desired delay and the reference levels $V_r$ and $V_o$, $$S_1 = \frac{V_r - V_o}{2t_d} \quad (2)$$

The crucial requirement of this system is that slope $S_2$ must be twice the slope $S_1$, $$S_2 = 2S_1 = \frac{V_r - V_o}{t_d} \quad (3)$$

The value of the ramp with slope $S_1$ at $t = t_p$ is $$V_a = S_1 t_p + V_o \quad (4)$$

The time required for the second ramp $S_2$ to reach the reference level when added to the level reached by the first ramp $S_1$ is $$t_m = \frac{V_r - V_a}{S_2} + t_p \quad (5)$$

Substituting from Equation 4

$$t_m = \frac{V_r - V_o - S_1 t_p}{S_2} + t_p \quad (6)$$

Substituting from Equations 2 and 3 and reducing the fraction $$t_m = \frac{(V_r - V_o) - \frac{V_r - V_o}{2t_d} t_p}{\frac{V_r - V_o}{t_d}} + t_p \quad (7)$$

gives $$t_m = t_d - \frac{t_p}{2} + t_p = t_d + \frac{t_p}{2} \quad (8)$$

which agrees with Equation 1.

More generally, any desired fractional point, C, $$t_m = t_d + C t_p \quad (9)$$

can be detected by relating the slopes according to the following equations $$S_1 = \frac{V_r - V_o}{K t_d} \quad (10)$$

and $$S_2 = K S_1 \quad (11)$$

Substituting Equations 10 and 11 into Equation 6 gives $$t_m = \frac{(V_r - V_o) \left(\frac{V_r - V_o}{K t_d}\right) t_p}{K \left(\frac{V_r - V_o}{K t_k}\right)} + t_p \quad (12)$$

Cancelling and rearranging $$t_m = t_d + \left(\frac{K - 1}{K}\right) t_p \quad (13)$$

and $$K = \frac{1}{1 - C} \quad (14)$$

the reciprocal of the complement of the fraction C.

Note that the reference levels cancel and the time is dependent only upon the delay time $t_d$, pulse width $t_p$, and the constant K. In FIGURE 2, with the input an electrical signal, the logic 10 is arranged such as to turn on a constant current source 20 during the time event of interest. At the end of the event, constant current source 20 is switched off and constant current source 30 is switched on. The integrator 40 conveniently consists of a capacitor which is charged linearly by the current sources 20 and 30 giving a voltage output which is detected by the cross-over detector 50. As the capacitor's voltage crosses the reference, voltage $V_r$, a marker voltage signal appears at the output. Also, the network is reset into readiness for the next event.

By adjusting the constant current sources 20 and 30 according to Equations 10 and 11, the cross-over time will be according to Equation 9 (or Equation 13).

FIGURE 3 schematically shows the logic 10, current sources 20 and 30, the integrator 40, and the cross-over detector 50.

The constant current source 20 consists of transistors 21 and 22 and the associated resistors. A voltage divider comprised of resistors 23 and 24 establishes a potential $V_i$. When logic input 63 is placed at a potential lower than $V_i - V_{be22}$, current source 20 is turned on. The voltage at the emitter of transistor 21 is $V_i - V_{be22} + V_{be21} = V_i$. The current $I_1$ is $$I_1 = \frac{V_{cc} - (V_i - V_{be22} + V_{be21})}{R_{25}} \quad (15)$$

If the base-emitter drops of transistors 21 and 22 are exactly equal, then current $I_1$ is controlled by resistors 25, 23, 24 and $V_{cc}$ (base current of transistor 22 can be made negligible with respect to the divider current)

$$I_1 = \frac{V_{cc}R_{23}}{R_{25}R_{23}+R_{24}} \quad (16)$$

Besides temperature compensation, transistor 22 allows switching the current source 20. Removing the logic signal 63 allows the base of transistor 21 to return to $V_{cc}$, back-biasing the emitter-base junction of transistor 21 and, therefore, turning off the current source 20.

Transistors 31 and 32 and the associated resistors make up current sources 30'. It operates exactly like source 20, using logic signal 64 for switching. $I_2'$ is controlled by resistors 35, 23, 24 and $V_{cc}$.

$$I_2' = \frac{V_{cc}R_{23}}{R_{35}(R_{23}+R_{24})} \quad (17)$$

Both currents are integrated by capacitor 41. The resulting voltage is applied to the base of transistor 51.

The cross-over detector is comprised of transistors 51 and 52. The reference level, $V_r$, is established by resistors 55 and 56 and is applied to the base of transistor 52.

As the voltage appearing across capacitor 41 approaches $V_r$, transistor 51 begins conductions. The resulting negative-going voltage appearing at the collector of transistor 51 is coupled through capacitor 53 to lower the conduction of transistor 52. This in turn enhances the conduction of transistor 51 and the circuit regenerates, thus putting out a negative-going step signal 62 as the marker output.

The advantages of the above network become apparent when looking at the cancellations of the possible circuit inaccuracies.

First, as the current sources share the same voltage reference, $V_i$, the changes in $V_{cc}$ or $V_i$ do not change the ratio of currents $I_1$ and $I_2$. In fact, the ratio of currents depend on the ratio of resistors 25 and 35 (which is easily controlled). Referring to Equations 11 and 13, it is this ratio which determines the placement of the marker signal in the hypothetical delayed pulse 61'.

Furthermore, this ratio does not change with power supply or capacitor variations, as is now shown.

Capacitor 41, having a capacitance $C_i$, integrates both currents. Therefore, the voltage slopes are:

$$S_1 = \left(\frac{\Delta V}{\Delta t}\right)_1 = \frac{I_1}{C_i} = \frac{V_{cc}-V_i}{R_{25}C_i} \quad (18)$$

$$S_2 = \left(\frac{\Delta V}{\Delta t}\right)_2 = \frac{I_2}{C_i} = \frac{V_{cc}-V_i}{R_{35}C_i} \quad (19)$$

Substituting Equations 18 and 19 into Equation 11 gives $$R_{25} = KR_{35} \quad (20)$$

showing the ratio of slopes are dependent on $R_{25}$ and $R_{35}$ only $$\frac{S_2}{S_1} = K = \frac{R_{25}}{R_{35}} \quad (21)$$

Secondly, note that each current source is dependent upon $V_{cc}$ as shown by Equations 16 and 17. Note also that the reference voltage is also dependent upon $V_{cc}$. The resultant effect is the cancellation of inaccuracies due to power supply variations. This is now shown.

From Equations 4 and 18

$$V_a = \frac{I_1}{C_i}t_p + V_o \quad (22)$$

From Equations 5 and 19

$$t_m - t_p = (V_r - V_a)\frac{C_i}{I_2} \quad (23)$$

Combining Equations 22 and 23 and solving for $t_m$ $$t_m = (V_r - V_o)\frac{C_i}{I_2} + t_p\left(1 - \frac{I_1}{I_2}\right) \quad (24)$$

The resistor divider network establishes the reference voltage $$V_r = \frac{V_{cc}R_{56}}{R_{55}+R_{56}} \quad (25)$$

and assuming that $V_o = 0$, Equation 24 becomes $$t_m = V_r\frac{C_i}{I_2} + t_p\left(1 - \frac{R_{35}}{R_{25}}\right) \quad (26)$$

by Equations 18, 19, 21, and 25. And by Equations 17, 21, and 25 we finally have, $$t_m = \frac{C_i R_{35} R_{56}(R_{23}+R_{24})}{R_{23}(R_{55}+R_{56})} + t_p\left(1 - \frac{1}{K}\right) \quad (27)$$

Note that the marker time ($t_m$) is independent of power supply variations as previously suggested by the Equation 13. Also, the delay time ($t_d$) is given by the term $$t_d = \frac{C_i R_{35} R_{56}(R_{23}+R_{24})}{R_{23}(R_{55}+R_{56})} \quad (28)$$

Third, the base-to-emitter voltage drops of transistors 21 and 22, 31 and 32 and 51 and 52 cancel, removing possible inaccuracies. Also, matched transistor pairs for 22 and 32 and 21 and 31 hold the ratio of currents ($I_2/I_1$) exact. Matched pairs for 55 and 56 eliminate threshold detector errors.

Fourth, as transistors 51 and 42 are off during the integration period, any error they tend to introduce can be made negligible by making the magnitudes of $I_1$ and $I_2$ sufficiently large relative to the transistor leakage currents.

Fifth, possible errors due to differences in $h_{fe}$, the beta characteristic of transistors 21 and 31, can be compensated for by using Darlington configurations in place of 21 and 31. Temperature compensation can be maintained by placing a diode in the resistor divider 23, 24.

Sixth, the above considerations refer to absolute accuracy. Relative accuracies (i.e., relative errors of the marker position for a series of closing occurring pulses) are even greater as drift of parameters are substantially self-cancelling.

The logic signals 63 and 64 for switching current sources 20 and 30' to integrator 40 are generated in a straightforward manner from the input pulse signal 61. A NOR gate 11 is arranged so that an output negative going signal occurs if and only if the input signal is a pulse for which a delayed midpoint marker signal 62 is to be generated. The output of gate 11 is accordingly applied to the base of transistor 21 which thereby turns on constant current source 20. The output of gate 11 is also applied to the base of transistor 14 of "one-shot" circuit. Transistor 14 generates a positive pulse which has a duration determined by the reset pulse 65. The one-short circuit accordingly conditions gate 12 so that at the termination of input pulse 61, at which time the output of gate 11 reverts to its original state, it causes NOR gate 12 to generate a negative going signal 64 which turns on transistor 31 for constant current source 30' in the same manner as gate 11 turns on source 20. Gate 11 also turns switching transistor 42 off during the input pulse 61 so that integrating capacitor 41 is operative. The transistor 42 is maintained off by NOR gate 13 as long as the one-shot transistor 14 is on. Resetting of the circuits is initiated by transistor 51, in detector 50, being turned on at the crossover point. When the voltage at the collector of transistor 51 drops, transistor 14 is turned on and NOR gates 12 and 13 revert to their original state, turning off source 30' and discharging capacitor 41 respectively. The output of cross-over detector 50 has a sharp leading edge followed by a humped waveform. Where a rectangular waveform is desired, it is conveniently provided by a one-shot circuit of the same type shown with transistor 14 and gate 13, but having a pulse duration selected as desired. It is noted that in the embodiment of FIGURE 3, the independent current sources 20 and 30 of FIGURE 2 are implemented by providing current sources 20 and 30' whereby current $I_1$ is provided by source 20 and current $I_2$ is provided by the sum of sources 20 and 30'. The resulting total currents $I_1$ and $I_2$ are the same, but control of current levels is simplified. Other optional variations include having $I_1$ be the difference between two sources (source 30 minus source 20) and having $I_2$ be the current from source 30 alone. Clearly, the essential consideration is the provision of the appropriate currents for integration. Accordingly, it is convenient to consider the total current generated during the input pulse as $I_1$ and the total current afterwards as $I_2$, regardless of what combinations and permutations of current sources are selected.

In practice, in designing a network in accordance with the invention, a delay time $t_d$ is selected which is greater than the duration $t_p/2$ of any expected pulses but less than the expected minimum time between pulses. $I_1$ is then selected such that the integrator and cross-over detector 50 can resolve the resulting voltage ramp with sufficient accuracy. That is, because $I_1 = S_1 C_1$, it is necessary to have the rate at which the integrator 40 voltage ramp rises great enough that the detector 50 can discriminate voltage differentials corresponding to the product of $I_1 C_1$ and the time error limit of the network. From the mathematical derivations above, it has been shown that with a slope $S_2$, a reference voltage $V_r$ can be selected so that a marker pulse is generated at time $t_m = t_p + C t_d$. Accordingly, $I_2$ and $V_r$ are selected as $I_2 = I_1/(1-C)$ and $$V_r C_i = I_1 \cdot t_d/(1-C)$$

These relationships insure that the marker signal will be generated at the fractional point C of any pulse less than $2t_d$ in duration, delayed by the known constant delay $t_d$.

If the range of input pulse repetition rates is changed, or for some other reason it is desirable to change the delay time, this can usually be done easily by changing $I_1$ and $I_2$. For example, to double the delay time $t_d$ for the FIGURE 3 pulse center detector, it is sufficient to merely halve $I_1$ and $I_2$. Because the product of $I_1 \cdot t_d$ is unchanged, the reference voltages $V_r$ requirement remains unchanged and the required current ratio of $I_1/I_2$ also remains constant. Therefore, the delay time $t_d$ is readily changed by any binary factor $2^n$. However, if the need is for moderately increasing the pulse repetition rate capability, it is usually even easier to simply change the reference voltage $V_r$ by the same fraction as the desired change in delay time $t_d$.

The invention may be implemented with a large number of different kinds of data processing components, even mechanical computer components can be used. For example, the FIGURE 2 system can be implemented with constant speed motor driven shafts as the sources of constant magnitude signals $I_1$ and $I_2$. Signal sources 20 and 30 are combined, with a differential, under control of relay operated clutches and integrated by a predetermined revolution counter. The predetermined counter performs the functions of integrator 40 and cross-over detector 50 by generating a marker signal at the accumulation of the predetermined revolution count. Conveniently, logic 10 responds to a time event or manual start control to couple a shaft having a constant speed of rotation to the counter. To generate a delayed midpoint marker signal, a second clutch adds the same shaft rotation rate to the differential thereby doubling the counting rate after the time event terminates.

FIGURE 5 illustrates a second embodiment of the invention which is particularly useful for applications where a stable relatively high frequency pulse source 70 is available. The frequency $f_0$ should be at least as high as required to make the time between $f_0$ pulses equal to the desired accuracy of the pulse center detector. In this embodiment the first signal, for slope $S_1$, is provided by flip-flop 71 which operates as a frequency divider producing a pulse rate $f_0/2 = I_1$. Pulse source 70 provides the second signal, for slope $S_2$ so that $I_2 = f_0$. Conveniently, switching of these signals is provided by a NOR gate logic circuit 10′, substantially the same as logic 10 in FIGURE 3. A first NOR gate switch 72 couples $I_1 = f_0/2$ to predetermined electronic counter 75 during the input pulse and a second NOR gate switch 73 couples the second signal $I_2 = f_0$ to predetermined counter 75 after the input pulse terminates until the output marker signal resets logic 10′. Where compatible, the logic signal for gate 72 conveniently is the input signal directly and the logic signal for the gate 73 is provided by a one-shot multivibrator responsive to the trailing edge of the input pulse. While predetermined counter 75 can be any electronic counter which emits an output pulse (the marker signal here) at a selected pedetermined count, it is more economical to employ simply a chain of binary counter stages. For example, with $f_0 = 1$ mc., and a delay time selected as 1.028 msec., a chain of ten binary stages generates the desired midpoint marker signal at $t_m = t_d + t_p/2$. As is evident from the foregoing, the predetermined counter 75 performs both the functions of integrating signals $I_1$ and $I_2$ and detecting the limit crossover so that the limit $V_r C_i$ is provided by the selected capacity of counter 75.

In the embodiment of FIGURE 3, noise below the selected pulse threshold level has no effect on midpoint detector operation, and insofar as the input pulse has a symmetrical form at the leading and trailing edges, a midpoint marker signal occurs at the same time. However, where noise levels exist such that there are spurious signals exceeding the selected input threshold level, spurious marker signals can normally be substantially eliminated by arranging logic 10 to reset the detector whenever an input pulse occurs before the detector has had time to reset itself. This is a representative special operating feature which does not basically modify the detector operation.

While particular embodiments of the invention have been shown and described herein, it is not intended that the invention be limited to such disclosure, but that changes and modifications can be made and incorporated within the scope of the claims.

What is claimed is:

1. Apparatus for generating a marker signal representing a desired fraction of a time event, the marker occurring a known predetermined time after the time event fractional point, comprising:
   (a) means for generating a first constant magnitude signal;
   (b) means for generating a second constant magnitude signal proportional to the magnitude of said first signal in accordance with the reciprocal of the complement of the desired fraction;
   (c) means for integrating said first signal for a time period equal to the time event and subsequently said second signal until a predetermined integration limit is reached proportional to the constant formed by the product of the known predetermined time delay and said first constant magnitude signal.

2. A pulse center detector comprising:
   (a) a first constant current source;
   (b) a second constant current source for generating double the current of said first source;
   (c) a current integrator for integrating currents from said current sources;
   (d) a detector, responsive to said current integrator, for generating an output marker signal representing the occurrence of a predetermined reference level;
   (e) logic means for successively coupling one of said current sources to said current integrator in response to the leading and trailing edges of the input pulse, respectively.

3. An electronic pulse detector for automatically generating a delayed marker signal representing the midpoint of a time event comprising:
   (a) two current sources for generating equal magnitude currents;
   (b) a logic circuit responsive to the time event pulse for turning on one of said current sources during the time event pulse and for turning on both after the pulse;

(c) integrating and cross-over detection means for integrating the constant currents and automatically producing the delayed marker signal at a predetermined integration level.

4. A detector system for generating a marker signal at a time $t_m$ which is a fraction C of an input pulse duration $t_p$, delayed by a constant time $t_d$, comprising:
  (a) an integrator, responsive to input information signals $i$, for providing an output signal $v$ proportional to the time integration of the magnitude of the input signals, that is,
  $$v = \frac{1}{C_i} \int i \, dt$$
  where $C_i$ is the integration constant;
  (b) a first constant signal source for generating a signal $I_1$;
  (c) a second constant signal source for generating a signal $I_2$ in accordance with the relationship
  $$I_2 = \frac{I_1}{(1-C)}$$
  (d) logic means for controlling said signal sources so as to apply signal $I_1$ to said integrator during the input pulse and to apply signal $I_2$ to said integrator after the pulse;
  (e) a signal cross-over detector for generating a marker pulse when the output of said integrator crosses an adjusted reference signal level $V_r$ where
  $$V_r C_i = I_1 \cdot t_d \cdot \frac{1}{1-C}$$
  whereby the marker signal is generated at a time $t_m$ such that
  $$t_m = t_d + C t_p$$

5. A method of generating a delayed marker pulse signal having a leading edge that occurs at a time $t_m$ which is a fraction C of a time event of duration $t_p$, with a constant delay time $t_d$, comprising:
  (a) generating a first constant signal $I_1$ during the time event;
  (b) generating a second constant signal, $I_2 = I_1/(1-C)$ after the time event;
  (c) performing a time integration of signals $I_1$ and $I_2$;
  (d) detecting when the signal integration level crosses a predetermined level equal to $I_1 \cdot t_d / (1-C)$ in such a manner that a marker signal is automatically generated at time $t_m = t_d + C t_p$.

6. A self-compensating pulse center detector network for generating a marker signal at the midpoint of an input pulse plus a constant time delay comprising:
  (a) a pair of identical current source circuits adapted to be energized by a common supply voltage source;
  (b) a cross-over detector circuit adapted to be energized by a voltage source common to said current sources;
  (c) a voltage divider circuit, for providing the reference voltage for said cross-over detector, adapted to be energized by the voltage source common to said current sources;
  (d) a capacitor arranged to integrate, with substantial linearity, the currents generated by said current sources and apply the resulting voltage ramp to said cross-over detector;
  (e) a logic circuit, for controlling said current sources in response to input pulse signals for which the midpoint marker signal is to be generated, in such a manner that one of said current sources is turned on during the pulse, and termination of the pulse produces double the slope of the voltage ramp generated by said integrator;
  (f) said voltage divider being adjusted to provide a reference voltage equal to twice the product of the delay time and the slope of the voltage ramp generated by said integrating capacitor during the pulse;
  (g) means to reset said integrator and logic circuit, responsive to the generation of the marker signal.

References Cited

UNITED STATES PATENTS 2,806,205   9/1957   Donath _____ 328—129
3,004,707   10/1961  Wilson _____ 324—68

ARTHUR GAUSS, *Primary Examiner.*

B. P. DAVIS, *Assistant Examiner.*